(12) United States Patent
Rule et al.

(10) Patent No.: US 9,701,459 B2
(45) Date of Patent: *Jul. 11, 2017

(54) SCAVENGING OXYGEN

(71) Applicant: COLORMATRIX HOLDINGS, INC., Wilmington, DE (US)

(72) Inventors: Mark Rule, Roswell, GA (US); Ronald J. Valus, Valley View, OH (US); Steven Burgess Tattum, Lancashire (GB)

(73) Assignee: COLORMATRIX HOLDINGS, INC., Wilmington, DE (US)

( * ) Notice: Subject to any disclaimer, the term of this patent is extended or adjusted under 35 U.S.C. 154(b) by 337 days.

This patent is subject to a terminal disclaimer.

(21) Appl. No.: 14/535,593

(22) Filed: Nov. 7, 2014

(65) Prior Publication Data

US 2015/0129454 A1 May 14, 2015

Related U.S. Application Data

(62) Division of application No. 12/524,402, filed as application No. PCT/GB2008/000258 on Jan. 24, 2008, now Pat. No. 8,906,299.

(60) Provisional application No. 60/897,158, filed on Jan. 24, 2007, provisional application No. 60/998,208, filed on Oct. 9, 2007.

(51) Int. Cl.
*B65D 81/26* (2006.01)
*A23L 3/3436* (2006.01)
*B65D 51/24* (2006.01)
*C01B 3/06* (2006.01)
*C08K 3/00* (2006.01)
*C08K 3/10* (2006.01)
*C08K 5/098* (2006.01)

(52) U.S. Cl.
CPC ............ *B65D 81/26* (2013.01); *A23L 3/3436* (2013.01); *B65D 51/244* (2013.01); *B65D 81/266* (2013.01); *C01B 3/065* (2013.01); *C08K 3/0041* (2013.01); *C08K 3/10* (2013.01); *C08K 5/098* (2013.01); *Y02E 60/362* (2013.01)

(58) Field of Classification Search
CPC .... B65D 81/26; B65D 81/266; B65D 51/244; A23L 3/3436; C08K 5/098; C08K 3/0041; C08K 3/10; C01B 3/065; Y02E 60/362

See application file for complete search history.

*Primary Examiner* — Timothy Cleveland
(74) *Attorney, Agent, or Firm* — Fay Sharpe LLP (57) ABSTRACT

A container 22 includes a shell 24 made from a polymer, for example PET, and incorporating a catalyst, for example a palladium catalyst. A closure 40 incorporates a plug which includes a source of hydrogen, for example a hydride. In use, with container 22 including a beverage and closure 40 in position, the headspace in the container will be saturated with water vapor. This vapor contacts the hydride associated with plug 42 and as a result the hydride produces molecular hydrogen which migrates into the polymer matrix of shell 24 and combines with oxygen which may have entered the container through its permeable walls. A reaction between the hydrogen and oxygen takes place, catalyzed by the catalyst, and water is produced. Thus, oxygen which may ingress the container is scavenged and the contents of the container are protected from oxidation.

20 Claims, 10 Drawing Sheets

SCAVENGING OXYGEN

This application claims priority to U.S. application Ser. No. 12/524,402, filed Sep. 30, 2009, which is a national stage filing of PCT/GB2008/000258 filed Jan. 24, 2008, which claims the benefit of U.S. Provisional Application No. 60/897,158, filed Jan. 24, 2007 and U.S. Provisional Application No. 60/998,208, filed Oct. 9, 2007; the disclosures of which are incorporated herein by reference.

BACKGROUND

This invention relates to scavenging oxygen. The present exemplary embodiments relate to a container. This invention finds particular application in conjunction with a container for food or beverages, and will be described with particular reference thereto. However, it is to be appreciated that the present exemplary embodiment is also amenable to other like applications.

Polymers such as poly(ethylene terephthalate) (PET) are versatile materials that enjoy wide applicability as fibers, films, and three-dimensional structures. A particularly important application for polymers is for containers, especially for food and beverages. This application has seen enormous growth over the last 20 years, and continues to enjoy increasing popularity. Despite this growth, polymers have some fundamental limitations that restrict their applicability. One such limitation is that all polymers exhibit some degree of permeability to oxygen. The ability of oxygen to permeate through polymers such as PET into the interior of the container is a significant issue, particularly for foods and beverages that are degraded by the presence of even small amounts of oxygen. For the purpose of this disclosure, permeable means diffusion of small molecules through a polymeric matrix by migrating past individual polymer chains, and is distinct from leakage, which is transport through macroscopic or microscopic holes in a container structure.

Besides food and beverages, other products affected by oxygen include many drugs and pharmaceuticals, as well as a number of chemicals and even electronics. In order to package these oxygen-sensitive products, brand owners have historically relied on the use of glass or metal packaging. More recently, brand owners have begun to package their products in plastic packages which incorporate either passive barriers to oxygen and/or oxygen scavengers. Generally, greater success has been achieved utilizing oxygen scavengers; however, oxygen scavenging materials heretofore have suffered from a number of issues. In particular, oxygen scavengers utilized to date rely on the incorporation of an oxidizable solid material into the package. Technologies utilized include oxidation of iron (incorporated either in sachets or in the container sidewall), oxidation of sodium bisulfite, or oxidation of an oxidizable polymer (particularly poly(butadiene) or m-xylylenediamine adipamide). All of these technologies suffer from slow rates of reaction, limited capacity, limited ability to trigger the scavenging reaction at the time of filling the container, haze formation in the package sidewall, and/or discoloration of the packaging material. These problems have limited the use of oxygen scavengers in general, and are especially significant for transparent plastic packaging (such as PET) and/or where recycling of the plastic is considered important.

It is well known that molecular oxygen will react with molecular hydrogen in the presence of a suitable catalyst. For example, Ann. Chim. Phys. Vol. 39, p 328 (1828) describes the platinum-catalyzed reaction between molecular hydrogen and molecular oxygen, and GB 1,188,170 describes the application of this technology to deoxygenating the contents of impermeable containers. In this patent, the container wall contains a redox catalyst and interior of the impermeable container is flushed with molecular hydrogen at the time of sealing. While this method is suitable for removing residual oxygen from the contents of impermeable containers, it would be of little value for permeable plastic containers. In the case of permeable plastic containers, any hydrogen introduced at the time of a sealing would be quickly lost because the permeability of plastics to hydrogen is quite high (for PET the permeability of hydrogen is about 15 times greater than the permeability of oxygen). In addition, oxygen would continue to permeate through the container walls and into the interior of the container over time. Hence any benefit from this approach would be short-lived, since any oxygen scavenged initially would be quickly replaced by ingressing oxygen, while any hydrogen initially present would be rapidly lost. Since brand owners generally desire product shelf-lifes in excess of three months (and sometimes as much as three years), such short-term protection is of little value.

SUMMARY OF THE INVENTION

We have now discovered that long-term protection from oxygen ingress can be provided to permeable containers by inclusion of a hydrogen generating means which may comprise one or more components that slowly release molecular hydrogen inside the container over an extended period of time. In the presence of a suitable catalyst, the molecular hydrogen will react with any oxygen present in the interior of the container or in the container wall. Preferably, the rate of hydrogen release is tailored to match the rate of oxygen ingress into the container. In addition, it is preferable for there to be an initial relatively rapid release of hydrogen, followed by a slow continual release over a period of months or even years. Furthermore, it is preferred that substantial release of hydrogen reliably begins only when the package is filled. Finally, it is preferable that the substance releasing hydrogen does not adulterate the contents of the container.

In a first aspect, the invention provides a container comprising hydrogen generating means for generating molecular hydrogen in a chemical reaction involving an active substance which is incorporated in said container. The container suitably includes a catalyst for catalyzing a reaction between said molecular hydrogen and molecular oxygen. As a result, molecular oxygen in said container, for example which passes into said container through a wall thereof, may be scavenged, with water as a byproduct.

For purposes of this disclosure, a container includes any package that surrounds a product and that contains no intentional microscopic or macroscopic holes that provide for transport of small molecules between the interior and the exterior of the package. Said container optionally comprises a closure. For purposes of this disclosure, a catalyst includes any substance that catalyzes or promotes a reaction between molecular hydrogen and molecular oxygen.

The container may include a sidewall constructed from a composition that includes a polymer resin first component and a second component comprising a catalyst capable of catalyzing a reaction between molecular hydrogen and molecular oxygen. The container may also include a third component capable of releasing molecular hydrogen for an extended period of time. The third component is preferably located within the container or near an interior surface of the container. The component capable of releasing molecular hydrogen is preferably located in or on a closure of said container. Suitably, the component capable of releasing molecular hydrogen comprises an active substance that releases molecular hydrogen by reaction with moisture.

In a second aspect, there is provided a method of scavenging oxygen in a container, the method comprising incorporating a hydrogen generating means in said container, said hydrogen generating means being arranged to generate molecular hydrogen in a chemical reaction involving an active substance which is incorporated in said container.

In a third aspect of the invention, there is provided a material for use in generation of molecular hydrogen, the material comprising an active substance provided in a polymeric matrix.

In a fourth aspect of the invention, there is provided a closure for a container, the closure comprising a material for use in generation of molecular hydrogen.

In a fifth aspect of the invention, there is provided a preform for a container or container per se comprising a promoter means for promoting a reaction between molecular hydrogen and molecular oxygen.

In a sixth aspect of the invention, there is provided a method of assembling a container which comprises securing a closure of the fourth aspect to a container of the fifth aspect.

In a seventh aspect of the invention, there is provided a packaged food or beverage comprising a container of said first aspect in which said food or beverage is arranged.

In an eighth aspect of the invention, there is provided a method of recycling a container of the fifth aspect which involves combining the container with other material which comprises a polymeric material of a type also used in said container and treating said container and other material so that it may be re-used.

Any feature of any aspect of any invention or embodiment described herein may be combined with any feature of any aspect of any other invention or embodiment described herein mutatis mutandis.

DETAILED DESCRIPTION

While a number of active substances are known that react with water to release molecular hydrogen, these substances may either react far too quickly to be of value, or develop protective oxide coatings over time that retard further generation of hydrogen. We have now discovered that the rate of generation of molecular hydrogen from a wide range of active substances can be greatly reduced and readily controlled by providing a means for restricting the rate at which moisture can reach the active substance. Thus, preferably, said hydrogen generating means, for example said active substance, may be associated with a restrictor means for restricting the rate moisture can reach the active substance. Such a restrictor means may comprise a matrix in which said hydrogen generating means may be associated, for example embedded or preferably dispersed. Suitable polymeric matrix materials can readily be selected based on the solubility of moisture in the bulk polymer. Suitable polymeric matrix materials include but are not limited to low density polyethylene, high density polyethylene, polypropylene, and ethylene vinyl acetate The ratio of the weight of hydrogen generating means to matrix material may be at least 0.01, preferably at least 0.02. The matrix may be a polymeric matrix and said hydrogen generating means may be dispersed therein. In general, once an active material is dispersed into a polymer, the rate of release of hydrogen is limited by either the permeation rate of water into the polymeric matrix and/or by the solubility of water in the chosen matrix. Thus, selection of polymeric materials based on the permeability or solubility of water in the polymer allows one to readily control the rate of release of molecular hydrogen from any number of active substances. In addition to allowing the controlled slow release of hydrogen, dispersion of the active substance into a polymeric matrix provides a simple method to isolate the active substance from the container contents, thus preventing adulteration of the product.

The polymeric matrix may include at least 1 wt % of active substance, preferably at least 2 wt %. The polymeric matrix may include less than 16 wt % of active substance. Suitably, the polymeric matrix includes 1-16 wt %, preferably 4-8 wt % of active substance. The balance of material in the polymeric matrix may predominantly comprise a said polymeric material.

Said active substance may comprise a metal and/or a hydride. A said metal may be selected from sodium, lithium, potassium, magnesium, zinc or aluminum. A hydride may be inorganic, for example it may comprise a metal hydride or borohydride; or it may be organic.

Active substances suitable for the release of molecular hydrogen as a result of contact with water include but are not limited to: sodium metal, lithium metal, potassium metal, calcium metal, sodium hydride, lithium hydride, potassium hydride, calcium hydride, magnesium hydride, sodium borohydride, and lithium borohydride. While in a free state, all of these substances react very rapidly with water; however, once embedded into a polymeric matrix, the rate of reaction proceeds with a half-life measured in weeks to months. For example, sodium borohydride reacts with pH 7 water with a half-life of less than about 5 seconds at 22 deg C. However, at 22 deg C., 4 wt % dispersion of sodium borohydride dispersed in low density polyethylene (LDPE) exhibits a half-time for hydrogen generation in excess of 180 days. Even more dramatically, when dispersed into LDPE, sodium hydride releases hydrogen over a period of months, whereas the dry powder ignites on exposure to water, and even a 60% oil dispersion of sodium hydride will release hydrogen violently.

Other active substances may include organic hydrides such as tetramethyl disiloxane and trimethyl tin hydride, as well as metals such as magnesium, zinc, or aluminum. Where the rate of reaction between the active substance and water is too slow, the addition of hydrolysis catalysts and/or agents are explicitly contemplated. For example, the rate of hydrolysis of silicon hydrides may be enhanced by the use of hydroxide or fluoride ions, transition metal salts, or noble metal catalysts.

It is also contemplated that the active substance may also be the polymeric matrix. For example, polymeric silicon hydrides such as poly(methylhydro)siloxane provide both a polymeric matrix and an active substance capable of releasing molecular hydrogen when in contact with moisture.

The hydrogen generating means, for example active substance, may be associated with a container in a variety of ways. Where a container includes a removable part, for example a closure, it may conveniently be associated with the closure. A closure may be releasably securable to a container body so that it can be removed and replaced, for example by being screw-threaded; or may be arranged to be removed but not replaced, for example by comprising a film which is adhered to a container body. In the latter case, the closure may comprise a film comprising a flexible "lidding" material as described hereinafter. In one embodiment, a container may include both a film closure which may provide an aseptic seal for the container and a releasably securable closure, both of which may independently include hydrogen generating means. After initial removal of both the releasably securable closure and the film closure, the releasably securable closure may be replaced and may generate hydrogen and therefore improve the storage life of the contents of the container.

When hydrogen generation occurs by reaction of the active substance with water, initiation of substantial hydrogen generation will occur only when the hydrogen generator is placed in a moisture-containing environment such as that found in most oxygen-sensitive foods and beverages. Thus initiation of hydrogen generation generally will coincide with the filling of the container and/or placement of the hydrogen generator into or near the interior of the container. In order to prevent or minimize hydrogen generation before this time, it is sufficient to minimize contact of the hydrogen generator with moisture. Unlike exclusion of molecular oxygen, exclusion of moisture is readily achieved by a number of methods, including but not limited to packaging the hydrogen generator and/or the structures containing the hydrogen generator in metal foil, metallized plastic, or polyolefin bags. For example, bulk packaging of closures containing hydrogen generating means in sealed polyethylene bags is an expedient way of limiting hydrogen generation prior to placement of the individual closures onto containers. Another method to limit contact of the hydrogen generator with moisture prior to placement of the individual closures onto containers is to place one or more dessicants inside the packaging with the closures.

Selection of suitable active substances for incorporation into a polymeric matrix can be based on a number of criteria, including but not limited to cost per kilogram, grams of $H_2$ generated per gram of active substance, thermal and oxidative stability of the active substance, perceived toxicity of the material and its reaction byproducts, and ease of handling prior to incorporation into a polymeric matrix. Of the suitable active substances, sodium borohydride is exemplary because it is commercially available, thermally stable, of relatively low cost, has a low equivalent molecular weight, and produces innocuous byproducts (sodium metaborate).

Because once released the molecular hydrogen will rapidly disperse throughout the interior of the container and permeate through all permeable portions of the container walls, the location of the active substance-containing polymeric matrix (hereinafter the hydrogen generator) within the container is not critical. In general, however, it is desirable to locate the hydrogen generator within the interior of the container in order to maximize the amount of hydrogen that is available for oxygen scavenging and minimize the amount of hydrogen generator required to obtain the desired degree of oxygen scavenging. Within the container, it is generally preferred to locate the hydrogen generator in an opaque portion of the container. For example, in a beverage container made of transparent PET, location of the hydrogen generator within the container closure is preferred. It is also generally preferred to locate the hydrogen generator behind a functional barrier such as a closure liner in order to prevent physical movement of the hydrogen generator during package storage, distribution, or use, and to eliminate the possibility of trace amounts of reaction byproducts from dissolving into the food or beverage.

In one embodiment, the hydrogen generator may be incorporated in a film which is part of a container and is arranged to be removed (and suitably not replaced) to allow access to the contents of the container. The film may comprise a laminate. It may include a layer which is substantially impermeable to oxygen for example a metal layer such as an aluminium layer. The film may include a hydrogen generating layer which includes a said hydrogen generator. The distance between the hydrogen generating layer and the contents of the container is preferably less than the distance between a said impermeable layer of the film and the contents of the container. The film may include a protective layer, wherein the distance between the protective layer and contents of the container is less than the distance between the hydrogen generating layer and the contents of the container. The film may be a lidding foil which is adhered to a container body to define a container.

Because the generated hydrogen will permeate through the container walls, the amount of hydrogen present within the container at any time is minimal. Moreover, the faster hydrogen is generated the faster it will permeate; hence significant increases in the rate of hydrogen generation (from, for example, increased container storage temperatures) will result in only modest increases in the concentration of hydrogen within the container. Because the permeability of hydrogen through a polymer is much greater than the permeability of oxygen, the amount of hydrogen in the headspace of the container may not need to exceed 4 volume percent, which is below the flammability limit for hydrogen in air. Furthermore, the solubility of hydrogen in food or beverages is low; hence at any time most of the hydrogen in the container will be in the headspace of the container. Hence, the amount of hydrogen that may be present within a container may be very small. For example, for a 500 ml PET beverage container with a 30 milliliter headspace volume and a 0.05 cc/package-day $O_2$ ingress rate, less than about 1 cc of hydrogen is needed within the container in order for the rate of $H_2$ permeation to be greater than the rate of oxygen ingress. In addition, the rate of $H_2$ generation would need to be only about 0.1-0.2 cc/day in order for enough hydrogen to be generated on an ongoing basis to react with most or all of the ingressing oxygen.

Because only small amounts of hydrogen need to be present inside the container in order to achieve high levels of oxygen scavenging, expansion and contraction of the container over time from the presence (or loss) of hydrogen is minimal. Consequently this technology is readily applicable to both rigid and flexible containers.

In order to facilitate the reaction between molecular hydrogen with molecular oxygen, a catalyst is desired. A large number of catalysts are known to catalyze the reaction of hydrogen with oxygen, including many transition metals, metal borides (such as nickel boride), metal carbides (such as titanium carbide), metal nitrides (such as titanium nitride), and transition metal salts and complexes. Of these, Group VIII metals are particularly efficacious. Of the Group VIII metals, palladium and platinum are especially preferred because of their low toxicity and extreme efficiency in catalyzing the conversion of hydrogen and oxygen to water with little or no byproduct formation. The catalyst is preferably a redox catalyst.

In order to maximize the efficiency of the oxygen scavenging reaction, it is preferable to locate the catalyst where reaction with oxygen is desired. For example, if the application requires that oxygen be scavenged before it reaches the interior of the container, incorporation of the catalyst in the package sidewall is desirable. Conversely, if scavenging of oxygen already present in the container is desired, it is generally preferable to locate the catalyst near or in the interior of the container. Finally, if both functions are desired, catalyst may be located both in the interior of the container and in the container walls. While the catalyst may be directly dispersed into the food or beverage, it is generally preferable that the catalyst be dispersed into a polymeric matrix. Dispersion of the catalyst into a polymeric matrix provides several benefits, including but not limited to minimization of food or beverage adulteration, minimization of catalyzed reaction between molecular hydrogen and food or beverage ingredients, and ease of removal and/or recycling of the catalyst from the food or beverage container.

A particular advantage of the present invention is that because of the extremely high reaction rates obtainable with a number of catalysts, very small amounts of catalyst may be required. A container may include 0.01 ppm to 1000 ppm, suitably 0.01 ppm to 100 ppm, preferably 0.1 ppm to 10 ppm, more preferably at least 0.5 ppm of catalyst relative to the weight of said container (excluding any contents thereof). In preferred embodiments, 5 ppm or less of catalyst is included. Unless otherwise stated reference to "ppm" refer to parts per million parts by weight.

The small amount of catalyst needed allows even expensive catalysts to be economical. Moreover, because very small amounts are required to be effective, there can be minimal impact on other package properties, such as color, haze, and recyclability. For example, when palladium is utilized as the catalyst, concentrations less than about 1 ppm of finely dispersed Pd may be sufficient to achieve acceptable rates of oxygen scavenging. In general, the amount of catalyst required will depend on and can be determined from the intrinsic rate of catalysis, the particle size of the catalyst, the thickness of the container walls, the rates of oxygen and hydrogen permeation, and the degree of oxygen scavenging required.

In order to maximize the efficacy of the catalyst, it is preferred that the catalyst be well dispersed. The catalyst can be either homogenous or heterogeneous. For homogeneous catalysts it is preferred that the catalysts be dissolved in a polymer matrix at a molecular level. For heterogeneous catalysts, it is preferred that the average catalyst particle size be less than 1 micron, more preferred that average catalyst particle size be less than 100 nanometers, and especially preferred than the average catalyst particle size be less than 10 nanometers. For heterogeneous catalysts, the catalyst particles may be free-standing, or be dispersed onto a support material such as carbon, alumina, or other like materials.

The method of incorporation of the catalyst is not critical. Preferred techniques result in a well dispersed, active catalyst. The catalyst can be incorporated into the container at any time prior to, during, or after the introduction of the hydrogen source. The catalyst can be incorporated into a polymeric matrix during polymer formation or during subsequent melt-processing of the polymer. It can be incorporated by spraying a slurry or solution of the catalyst onto polymer pellets prior to melt processing. It can be incorporated by injection of a melt, solution, or suspension of the catalyst into pre-melted polymer. It may also be incorporated by making a masterbatch of the catalyst with polymer and then mixing the masterbatch pellets with polymer pellets at the desired level before injection molding or extrusion. In containers wherein the catalyst is located in the interior of the container, the catalyst may be co-mingled with the active substance in the matrix of the hydrogen generator.

In a preferred embodiment, the catalyst is incorporated into a wall of the container. It is preferably associated with, for example dispersed in, a polymer which defines at least part of the wall of the container. In a preferred embodiment, the catalyst is associated with material which defines at least 50%, preferably at least 75%, more preferably at least 90% of the area of the internal wall of the container.

In a preferred embodiment, the catalyst is distributed substantially throughout the entire wall area of a container, optionally excluding a closure thereof.

The containers contemplated in the present invention may be either of a monolayer or a multilayer construction. In a multi-layered construction, optionally one or more of the layers may be a barrier layer. A non-limiting example of materials which may be included in the composition of the barrier layer are polyethylene co-vinyl alcohols (EVOH), poly(glycolic acid), and poly(metaxylylenediamine adipamide). Other suitable materials which may be used as a layer or part of one or more layers in either monolayer or multilayer containers include polyester (including but not limited to PET), polyetheresters, polyesteramides, polyurethanes, polyimides, polyureas, polyamideimides, polyphenyleneoxide, phenoxy resins, epoxy resins, polyolefins (including but not limited to polypropylene and polyethylene), polyacrylates, polystyrene, polyvinyls (including but not limited to poly(vinyl chloride)) and combinations thereof. Furthermore glassy interior and/or exterior coatings ($SiO_x$ and/or amorphous carbon) are explicitly contemplated as barrier layers. All of the aforementioned polymers may be in any desired combination thereof. Any and all of these materials may also comprise the container closure.

In a preferred embodiment, the container includes walls defined by polyester, for example PET and preferably catalyst is dispersed within the polyester.

The shape, construction, or application of the containers used in the present invention is not critical. In general, there is no limit to the size or shape of the containers. For example, the containers may be smaller than 1 milliliter or greater than 1000 liter capacity. The container preferably has a volume in the range 20 ml to 100 liter, more preferably 100 ml to 5 liter. Similarly, there is no particular limit to the thickness of the walls of the containers, the flexibility (or rigidity) of the containers, or the intended application of the containers. It is expressly contemplated that the containers include but are not limited to sachets, bottles, jars, bags, pouches, trays, pails, tubs, barrels, blister packs, or other like containers. Furthermore, the container may be located in the interior of another container, or have one or more containers located in the interior of the container.

Said container may include a permeable wall comprising of one or more polymers that have in the absence of any oxygen scavenging a permeability between about $6.5 \times 10^{-7}$ $cm^3$-cm/($m^2$-atm-day) and about $1 \times 10^4$ $cm^3$-cm/($m^2$-atm-day).

The shape of the hydrogen generator of the present invention is not critical. In general, the hydrogen generator can be formed into any shape suitable for incorporation into a container. Specific shapes contemplated include but are not limited to pellets, disks, films, fiber, woven fabric, non-woven fabric, and powders.

It is generally desirable to tailor the length of time hydrogen will be released from the hydrogen generator to be similar to or greater than the desired shelf-life of the product that is to be protected from oxygen ingress. Tailoring the length of time hydrogen will be released is straightforward—the lower the solubility of water is in a polymeric matrix, the slower the rate of reaction of the active substance will be. For 4 wt % sodium borohydride in polyethylene, at room temperature the half-time of reaction is approximately 180 days, which is more than sufficient for many food and beverage products. It is also desirable to tailor the rate of hydrogen generation to be equal to or somewhat greater than two times the rate of oxygen ingress, since the overall reaction is $2 H_2+O_2 \rightarrow 2 H_2O$. Tailoring the rate of hydrogen generation can be accomplished simply by measuring the rate of hydrogen generation from a hydrogen generator of known mass and then adjusting the mass so that the rate of hydrogen generation is at least twice the rate of oxygen ingress expected for the container in question.

The hydrogen generating means is suitably arranged to generate hydrogen for an extended period of time, for example at least 1 week, preferably at least 1 month, more preferably at least 3 months, especially at least 6 months. The aforementioned periods may be assessed after storage at room temperature (22° C.) and ambient pressure.

It may also be preferred to scavenge oxygen that is initially present in the container or the food or beverage. To do so it is preferred that the hydrogen generator initially release hydrogen at an enhanced rate. In these instances, it is also preferred that a catalyst be located in or near the interior of the container.

It is expressly contemplated that there may be a plurality of hydrogen generators provided, each with independently controllable hydrogen generation rates. By providing a plurality of hydrogen generators, the rate of hydrogen generation within a container can be tailored to meet any desired profile. It is also contemplated that in addition to providing at least one hydrogen generator, molecular hydrogen may be added to the interior of the container at the time of sealing.

In a further embodiment, a closure which includes hydrogen generating means may be used to replace an existing closure of a container to increase the rate of hydrogen generation in the container and/or to provide a means of oxygen scavenging or enhanced oxygen scavenging in the container. For example, such a closure may replace an existing closure which has and never had any means of generating hydrogen—it may be a conventional inactive closure. This may provide a means for a customer to enhance domestic storage life of an oxygen sensitive product. Alternatively, such a closure may replace an existing closure which includes (or included) a means for generating hydrogen but wherein the rate is less than optimum, for example due to the age of the closure and/or the time it has been generating hydrogen. Thus, the invention extends to a method of providing a container with means for scavenging oxygen, the method comprising replacing an existing closure of a container with a closure which comprises a hydrogen generating means for generating molecular hydrogen.

When the existing closure replaced is one which has never had any means of generating hydrogen, said closure may incorporate both a means of generating hydrogen and a catalyst for catalyzing a reaction between molecular hydrogen and molecular oxygen. In this case, the closure may suitably be protected prior to use by means which prevents or restricts moisture access to the hydrogen generator. Such means may comprise a foil or other impermeable material which is associated with the closure and arranged to prevent passage of moisture to the hydrogen generator.

When an existing closure is replaced, the replacement closure may be similar to the closure removed. When the catalyst is located in a wall of the container, the closure may have no catalyst and may only include said means for generating hydrogen. Thus, in the latter case, the method may comprise renewing or recharging the hydrogen generating ability of a container by replacing an existing closure with a new closure which includes a means of generating hydrogen which is enhanced compared to the closure replaced.

Specific embodiments of the invention will now be described by way of example, with reference to the accompany figures, wherein.

Figure 1:
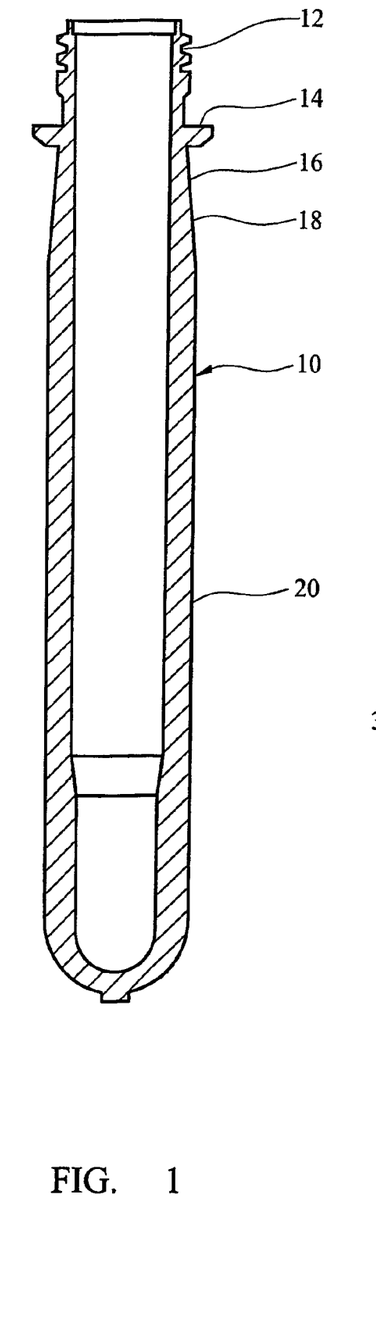
FIG. 1 is a cross-section through a perform.
Figure 2:
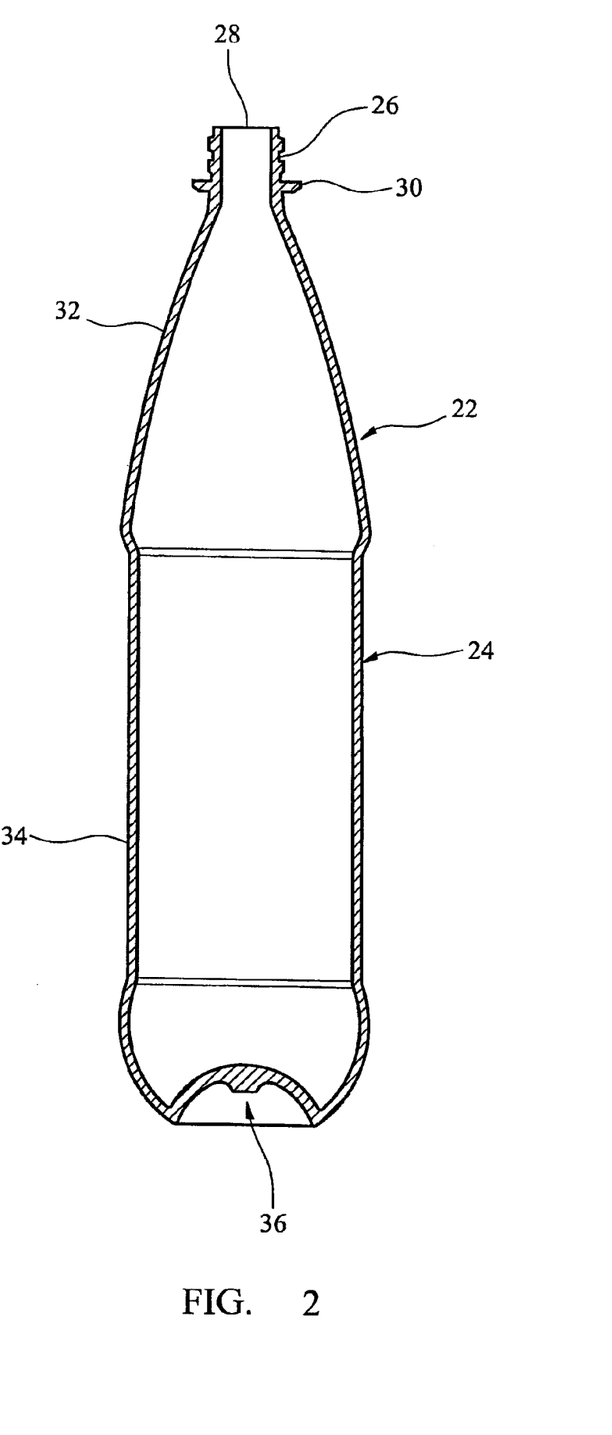
FIG. 2 is a cross-section through a bottle.
Figure 3:
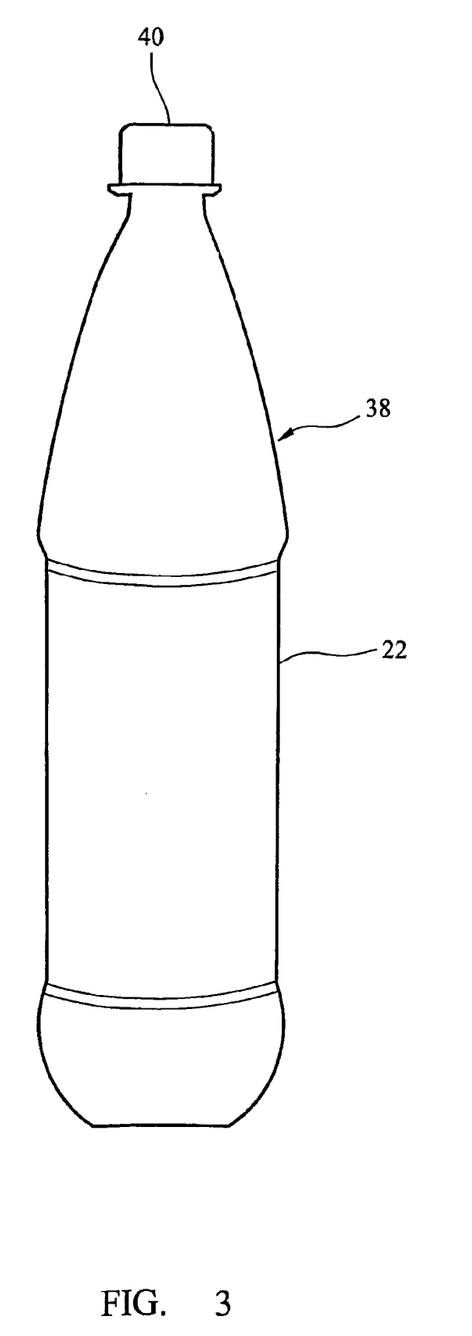
FIG. 3 is a side elevation of a bottle including a closure.

A preform 10 illustrated in FIG. 1 can be blow molded to form a container 22 illustrated in FIG. 2. The container 22 comprises a shell 24 comprising a threaded neck finish 26 defining a mouth 28, a capping flange 30 below the threaded neck finish, a tapered section 32 extending from the capping flange, a body section 34 extending below the tapered section, and a base 36 at the bottom of the container. The container 10 is suitably used to make a packaged beverage 38, as illustrated in FIG. 3. The packaged beverage 38 includes a beverage. The beverage may be a carbonated beverage or non-carbonated beverage. Examples of suitable beverages include soda, beer, wine, fruit juices, and water. In one particular embodiment, the beverage is an oxygen sensitive beverage. In another embodiment, the beverage is a vitamin C containing beverage such as a vitamin C containing fruit juice, a beverage which has been fortified with vitamin C, or a combination of juices in which at least one of the juices includes vitamin C. In this embodiment, the beverage is disposed in the container 22 and a closure 40 seals the mouth 28 of container 22.

Figure 4:
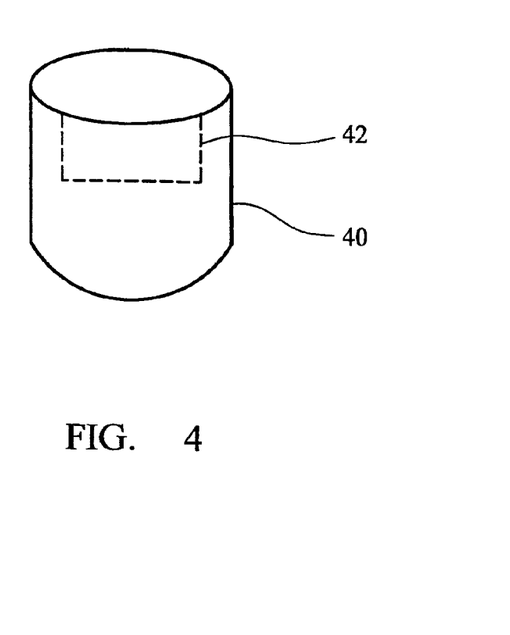
FIG. 4 is a closure, partly in cross-section.

Depicted in FIG. 4 is an embodiment of a closure 40 which includes a plug 42 in phantom. Preferably, plug 42 is located on an internal surface of cap 40. The plug may include one or more of the sources of hydrogen. For example, the plug 42 may incorporate a hydride dispersed in a polymeric matrix. Incorporation in the matrix reduces and allows control of the rate of release of hydrogen by the hydride and also allows the plug to be formed, by injection moulding (or other process) into a suitable shape.

The shell 24 of the container includes a catalyst. The catalyst may be dispersed in the polymer matrix, for example PET, which defines the shell 24 by injection molding polymeric matrix material and catalyst, for example a palladium compound, to define a perform 10 which is subsequently blow molded to define the container 22.

In use, with container 22 including a beverage and closure 40 in position, the headspace in the container will be saturated with water vapor. This vapor contacts the hydride associated with plug 42 and as a result the hydride produces molecular hydrogen which migrates into the polymer matrix of shell 24 and combines with oxygen which may have entered the container through its permeable walls. A reaction between the hydrogen and oxygen takes place, catalysed by the catalyst, and water is produced. Thus, oxygen which may ingress the container is scavenged and the contents of the container are protected from oxidation. The scavenging effect may be maintained for as long as hydrogen is produced in the container and such time may be controlled by inter alia varying the amount of hydride in the plug 42.

In the following, Examples 1-3 illustrate that a catalyst can be incorporated into PET and scavenge oxygen by reaction of hydrogen introduced into the container with oxygen which may permeate the container, Examples 4-5 illustrate the generation of hydrogen from plaques molded from LDPE and a hydride; Examples 6-7 illustrate how the thickness of the plaques affects the rate of hydrogen generation; Examples 8-10 illustrate the effect of concentration of hydride in plaques on hydrogen generation; Examples 11-12 demonstrate oxygen scavenging in permeable plastics containers; Examples 13-14 illustrate scavenging of oxygen already present in containers; and Examples 15-17 illustrate the need for sustained hydrogen generation to provide extended protection against oxygen ingress.

In one embodiment, there is provided a beverage container comprising:
a sidewall constructed from a composition including a polymer resin first component, for example poly(ethylene terephthalate), and a second component comprising at least one of a noble metal, a noble metal hydride, and combinations thereof; and
a source of hydrogen capable of reacting with moisture located at a position so that the source may react with moisture.

The source of hydrogen may be located on a surface facing an interior of the container. The release of hydrogen from the source of hydrogen may occur for a period of at least 20 days. The source of hydrogen may be located at a position comprising an internal surface of the container, for example an internal surface of a closure.

Examples 1-3

Palladium acetate was dispersed into tributyl citrate at 1 and 10 wt % loadings, and the resulting dispersions were blended with Wellman Ti818 PET resin at a let-down ratio of 0.21% to provide 1.0 and 10 ppm Pd loadings in the PET. The resulting dispersions and the base resin were separately injection molded into 24 gram preforms and 500 ml bottles were blown from the preforms. There were thus obtained 500 ml bottles containing 0, 1.0, and 10 ppm Pd as a fine dispersion.

Figure 5:
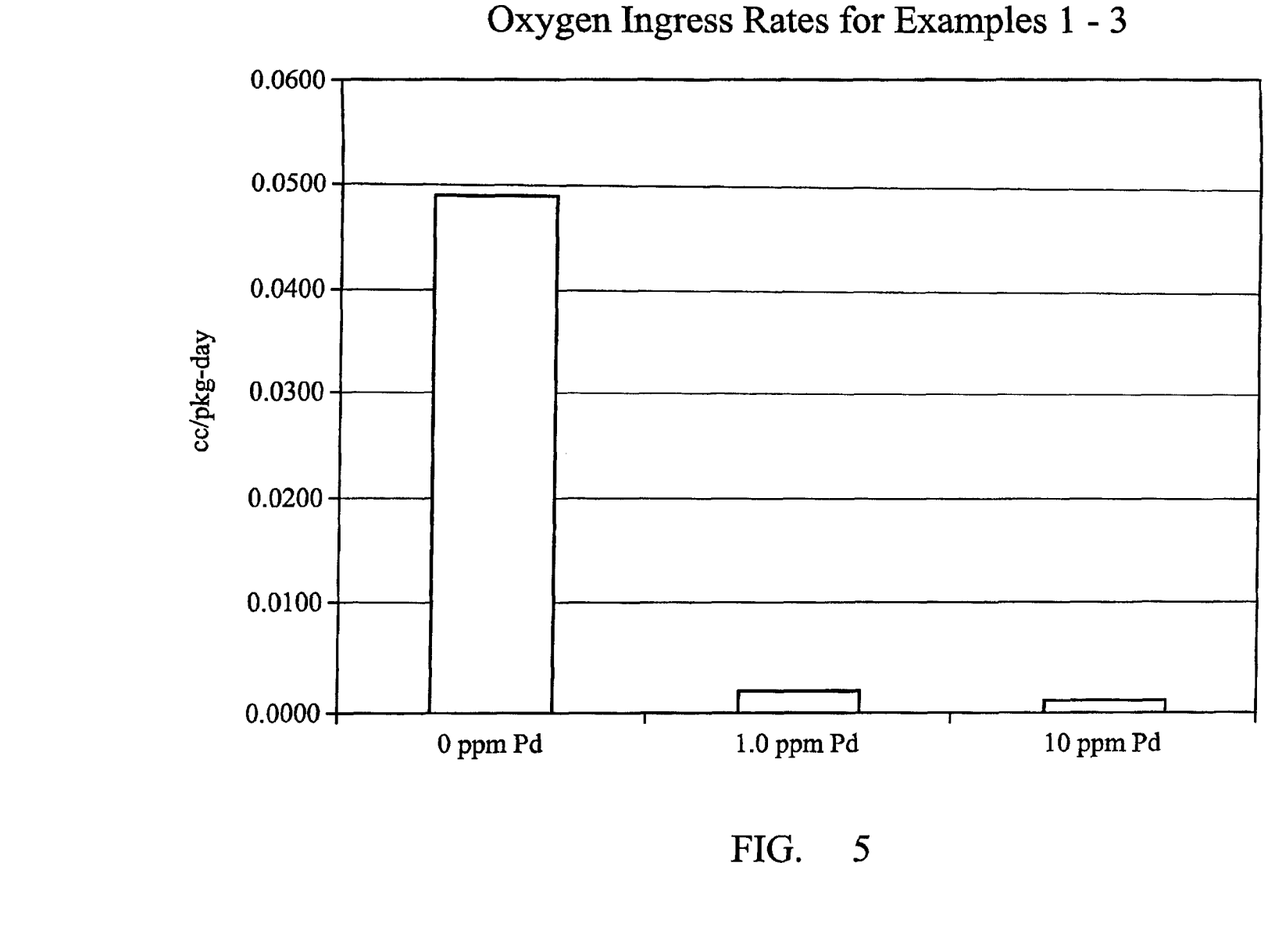
FIG. 5 is a graph detailing oxygen ingress for examples 1-3.

These three variables were subjected to MOCON™ testing for oxygen ingress using as a carrier gas nitrogen containing 3 volume % molecular hydrogen. The apparent steady-state rate of oxygen ingress is shown in Table 1 and FIG. 5.

TABLE 1

|  | ppm Pd | O2 ingress rate (cc/pkg-day) | S.D. |
| --- | --- | --- | --- |
| Example 1 | 0 | 0.0490 | 0.0014 |
| Example 2 | 1.0 | 0.0017 | 0.0002 |
| Example 3 | 10 | 0.0010 | 0.0001 |

Examples 4-5

Figure 6:
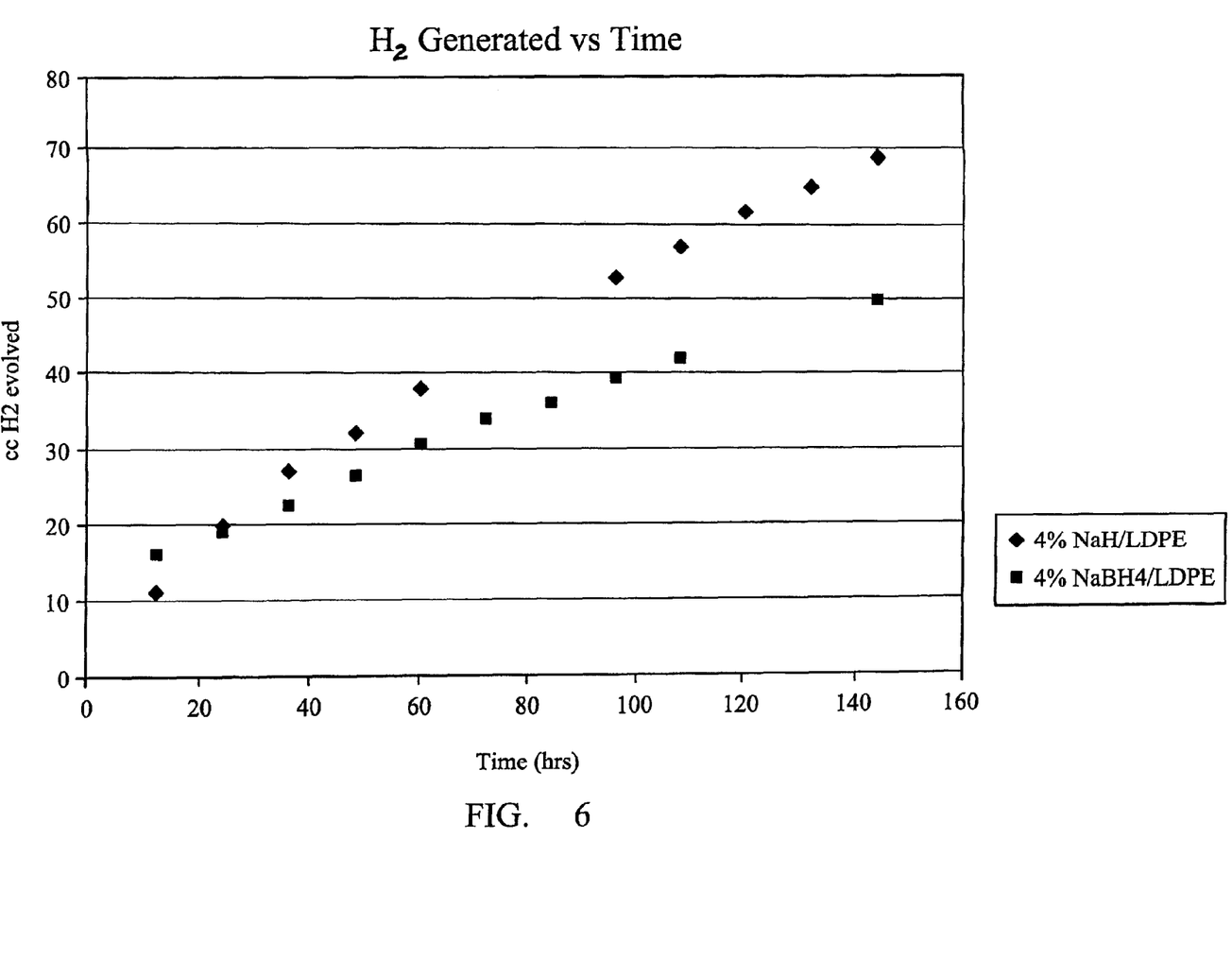
FIGS. 6 and 7 are graphs of hydrogen generated vs. time.

Into Dow Chemical LDPE 9931 was blended with 4 wt % sodium hydride (60% dispersion in mineral oil) or with 4 wt % sodium borohydride. Each variable was injection molded into 2 inch×3 inch plaques that were 30 mils thick over one half of the plaque and 45 mils over the remaining portion of the plaque. Each plaque weighed approximately 3.8 grams. After molding, the plaques were heat sealed in foil bags until tested. To test the plaques, one plaque was placed into a 100 ml graduated cylinder, which was then filled with water and inverted into a water-filled 1 liter beaker. Hydrogen generation was measured by noting the amount of water displaced from the graduated cylinder over time. The results are shown in FIG. 6. As can be seen, when these active substances are incorporated into a polymeric matrix, the rate of hydrogen generation is greatly reduced, and that molecular hydrogen is released over a prolonged period of time.

Examples 6-7

Figure 7:
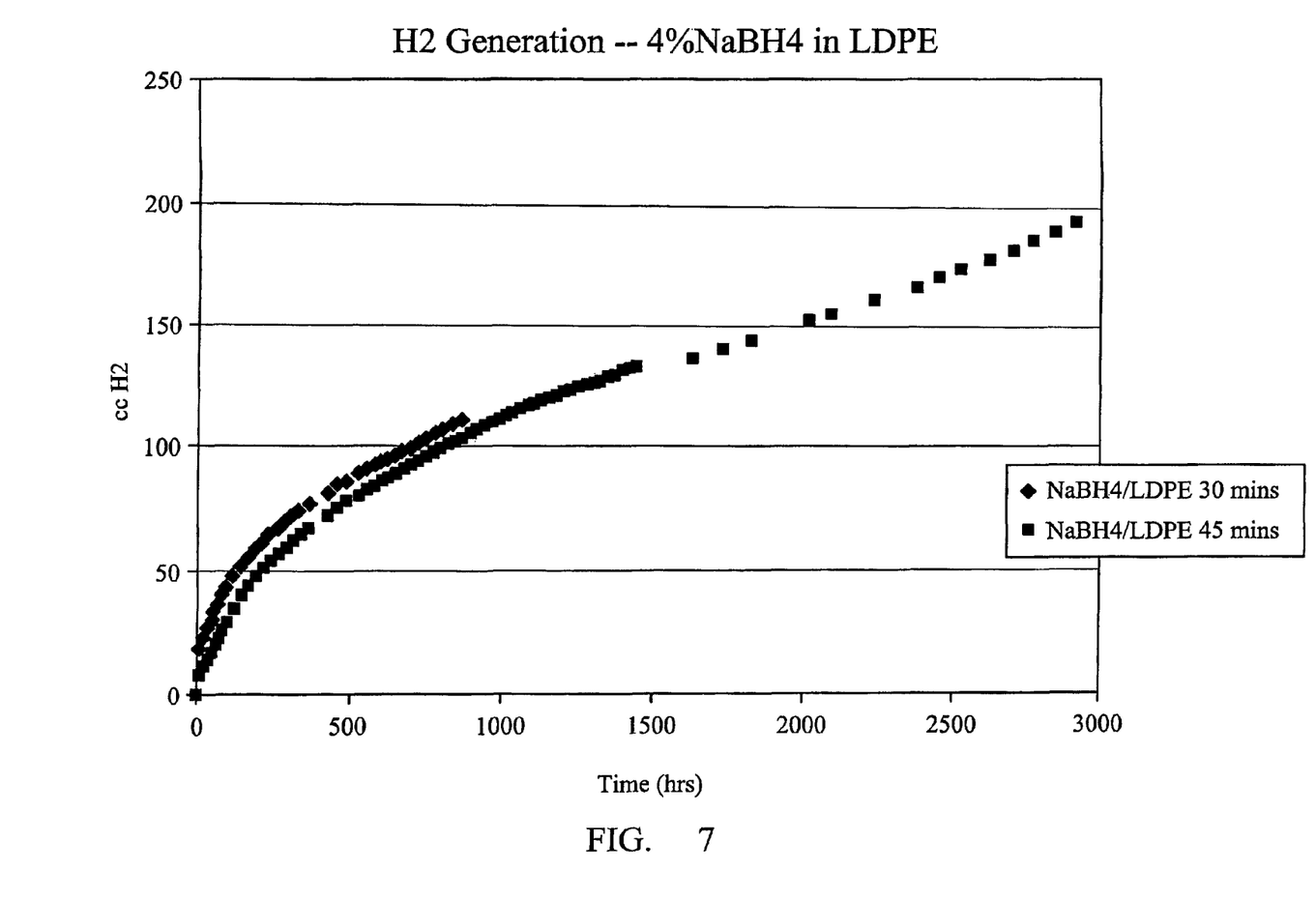

Two 4 wt % sodium borohydride/LDPE plaques produced in Example 5 above were cut in half to produce two 30 mil pieces and two 45 mil pieces. The two 30 mil pieces were placed in one graduated cylinder and the two 45 mil pieces were placed in a separate graduated cylinder. The combined weight of the two 30 mil pieces was about 3.2 grams, and the combined weight of the two 45 mil pieces was about 4.6 grams. Both cylinders were filled with water and were inverted into separate water-filled 1 liter beakers. Hydrogen generation was measured by noting the amount of water displaced from the graduated cylinder over time. Whenever the amount of water displaced approached 80 ml, the cylinders were refilled with water and testing continued. The results are shown in FIG. 7.

Figure 8:
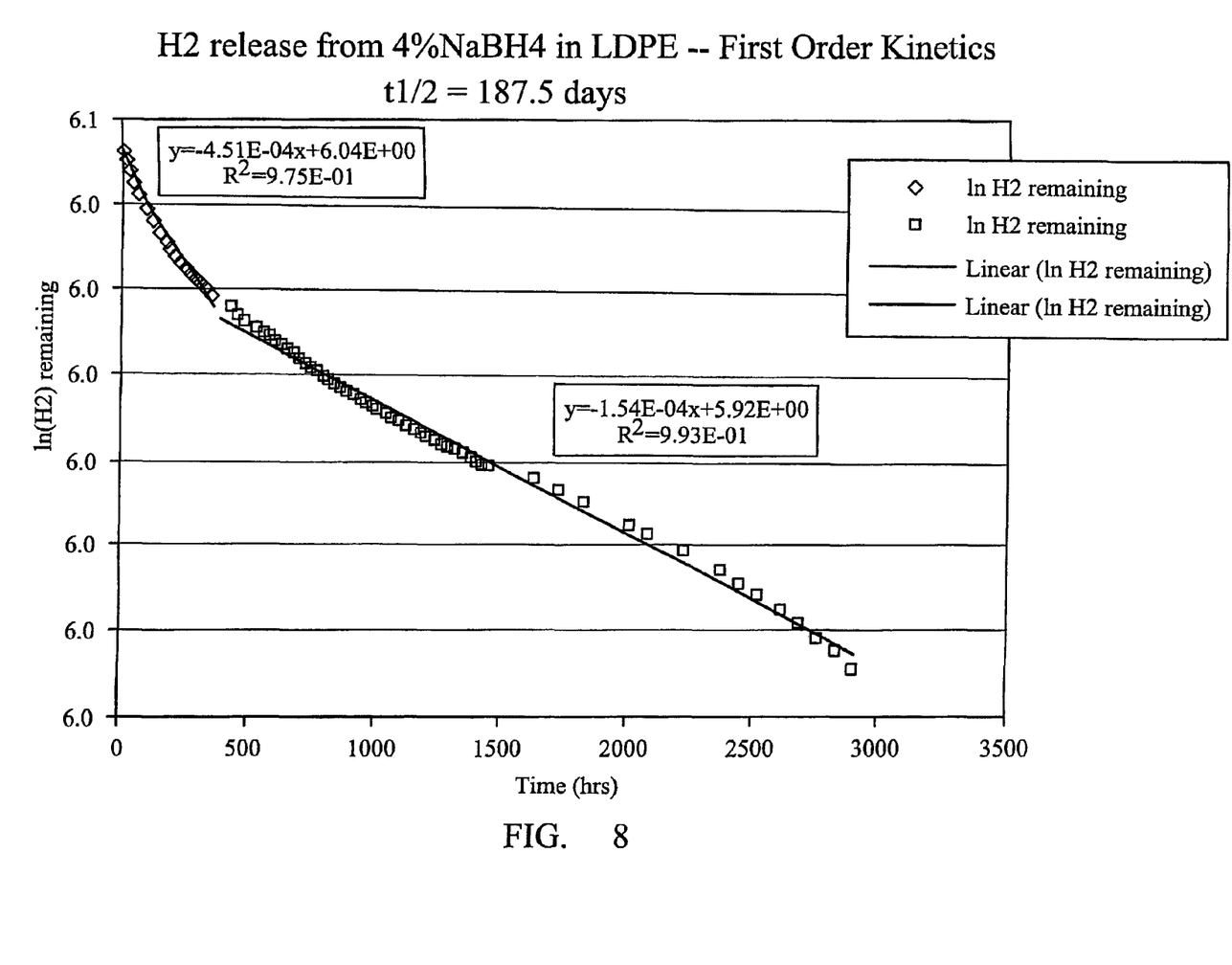
FIG. 8 is a graph illustrating hydrogen release vs time.

It is apparent from this graph that the initial rate of hydrogen generation is dependent on the thickness of the plaque, but at longer times the rate of hydrogen generation is independent of plaque thickness. This result suggests that the initial rate of hydrogen generation is dependent on the rate of permeation of water into the LDPE, but at longer times is dependent only on the solubility of water in the LDPE. It is also apparent that when the active substance in incorporated into a polymeric matrix, hydrogen generation proceeds for an extremely extended period of time. It is also apparent that large quantities of hydrogen can be generated from relatively small amounts of material. For the 45 mil plaques, the theoretical amount of hydrogen that could be released is 430 cc. By plotting the log of the amount of hydrogen remaining vs. time, a first order rate constant can be obtained. That data and the predicted half-time of reaction are shown in FIG. 8.

Examples 8-10

Figure 9:
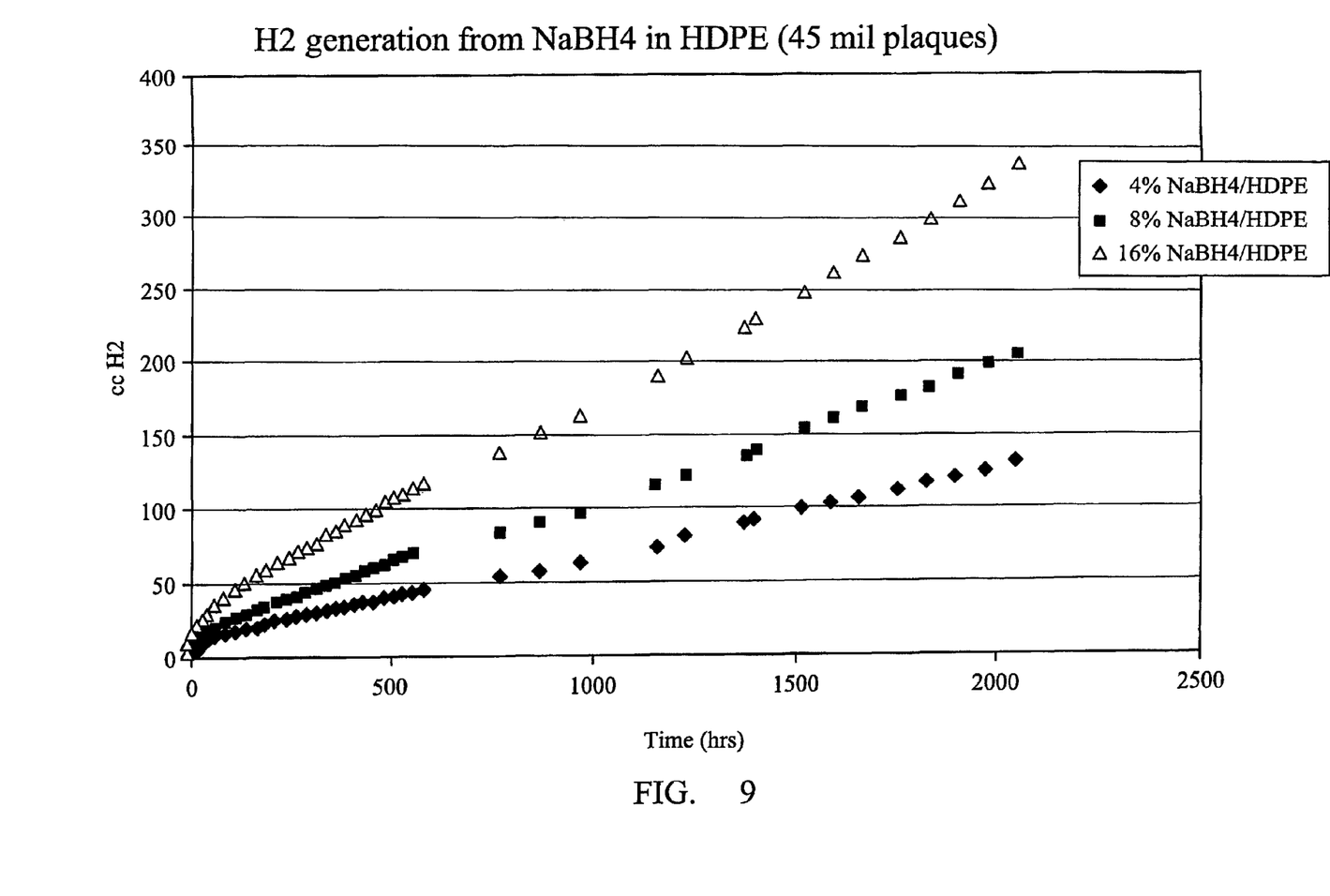
FIG. 9 is a graph illustrating hydrogen generation vs time.

In order to study the effect of the concentration of the active substance on the rate of hydrogen generation, sodium borohydride was compounded into Dow Chemical DMDA 8907 HDPE at nominal loadings of 4, 8, and 16 weight percent and was molded into 45 mil thick 2 inch×3 inch plaques. Hydrogen generation was measured as before. The results are shown in FIG. 9.

Examples 11-12

Figure 10:
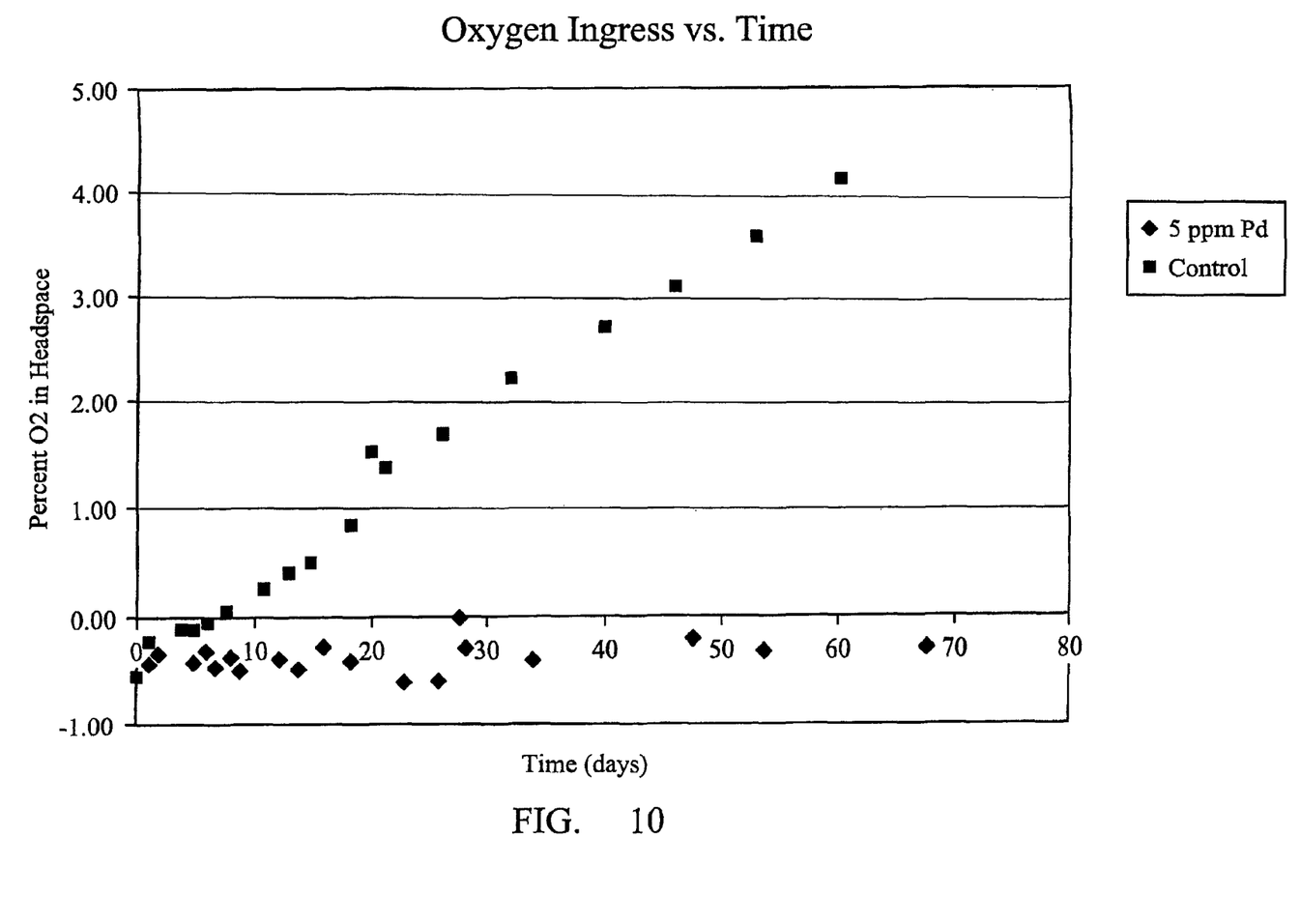
FIG. 10 is a graph illustrating oxygen ingress over time.

To demonstrate the efficacy of the present invention in scavenging ingressing oxygen into permeable plastic containers, Wellman Ti818 PET resin was molded into 24 gram preforms and blown into 500 ml bottles. The control bottle (Example 11) contained no added palladium, while the test bottle (Example 12) contained 5 ppm Pd added as palladium acetate. In order to track the internal oxygen content, both bottles were fitted with two O$_2$XYDOTS™ dots (one situated to be above and one below the liquid level). Each bottle was filled with 500 ml of tap water. Into the test bottle was suspended above the liquid level a 10.7 cm$^2$, 45 mil thick LDPE plaque that contained 8 wt % sodium borohydride. Both bottles were purged with nitrogen until the oxygen content was essentially zero and were then sealed. The internal headspace oxygen content over time was then tracked using the Oxysense™ test methodology, with calibration against standards being performed immediately before each measurement. The results of that testing are shown in FIG. 10. As can be seen from this Figure, in the control bottle oxygen ingress began immediately and continued at a steady rate. In contrast, with the bottle containing 5 ppm Pd in the bottle sidewall and a hydrogen generator inside the container there was no measurable increase in oxygen concentration inside the bottle for more than two months.

Examples 13-14

Figure 11:
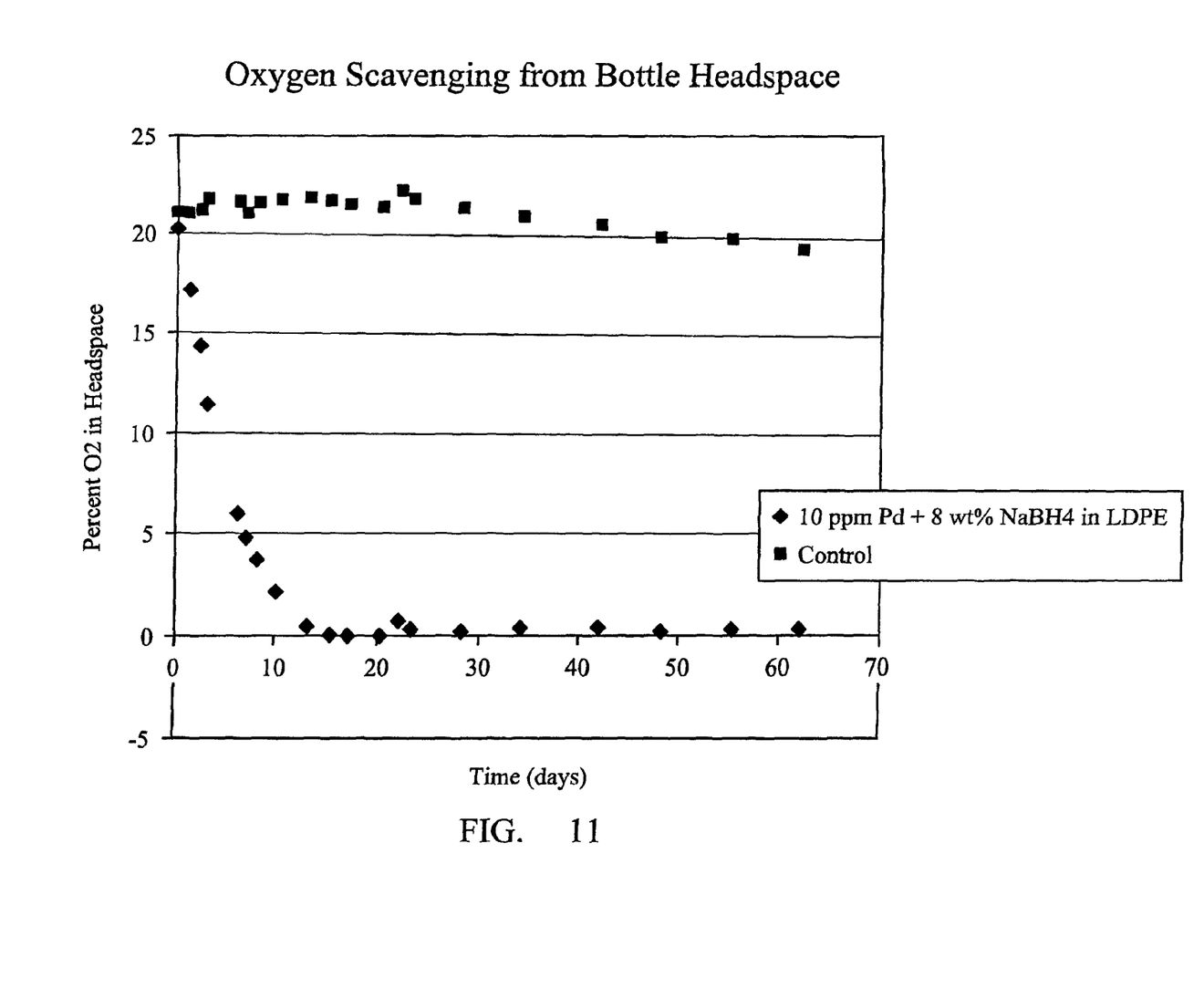
FIG. 11 is a graph illustrating oxygen scavenging vs time.

To demonstrate the efficacy of the present invention toward scavenging oxygen initially present in the container, PET bottles were prepared as before. Both bottles were fitted with two O₂XYDOTS™, then were filled with 500 ml of tap water. Into the test bottle was suspended above the liquid level a 10.7 cm² 45 mil thick LDPE plaque containing 8 wt % sodium borohydride and 10 ppm Pd (added as palladium acetate). The bottles were then sealed. As before, the internal headspace oxygen content was tracked over time using the Oxysense™ test methodology. The results are shown in FIG. 11.

It is apparent that there was no change in the headspace oxygen content with the control bottle. In contrast, in the bottle containing the hydrogen generator and catalyst the amount of oxygen dropped rapidly to undetectable levels and remained at those levels for an extended period of time.

Examples 15-17

Figure 12:
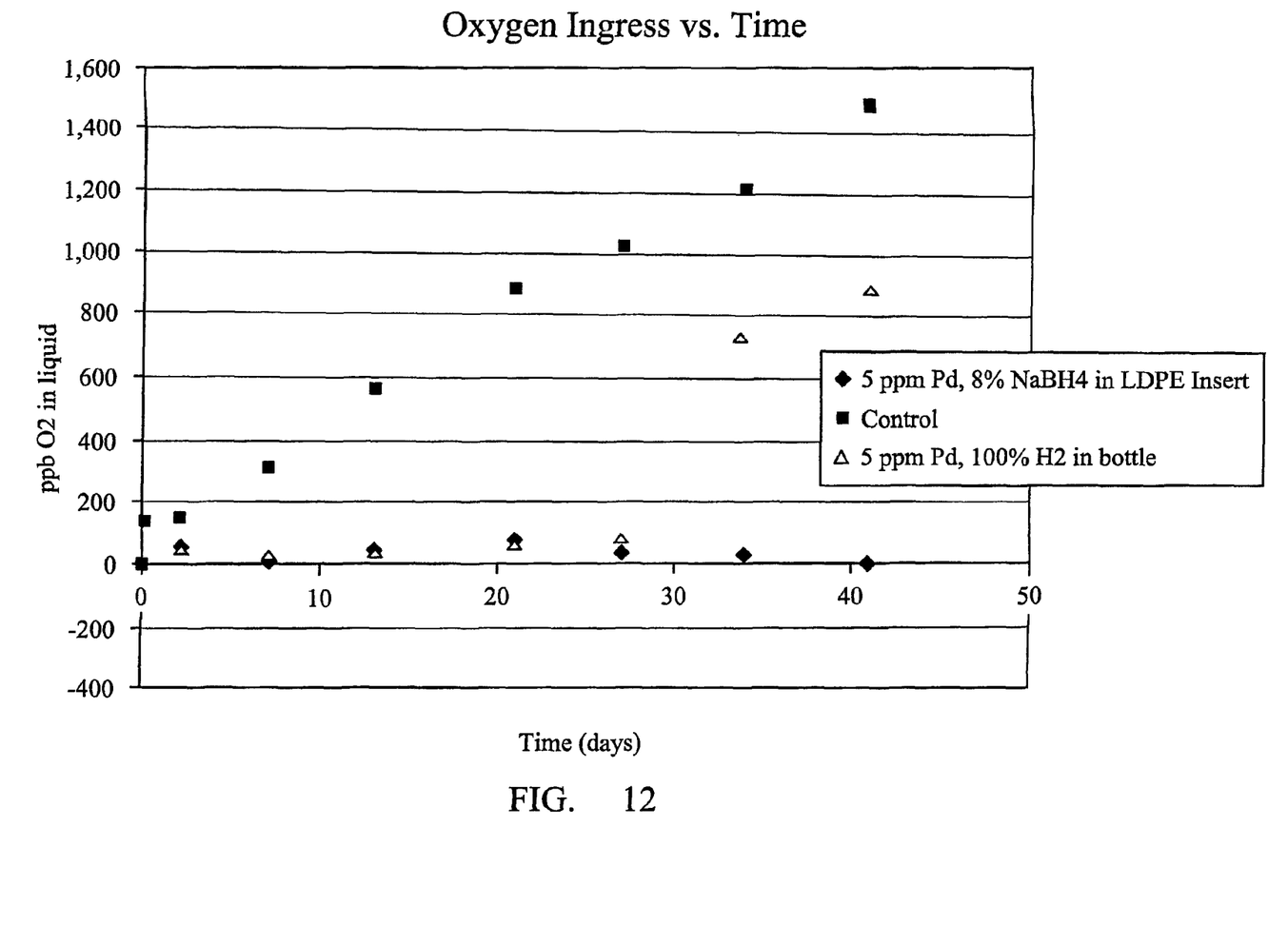
FIG. 12 is a graph illustrating oxygen ingress over time.

To illustrate the need for sustained generation of molecular hydrogen in permeable containers in order to obtain extended protection from oxygen ingress, the following experiment was performed. Wellman Ti818 PET resin was molded into 24 gram preforms and blown into 500 ml bottles containing 5 ppm palladium added as palladium acetate. In order to track the internal oxygen content, three bottles were fitted with two O₂XYDOTS™ dots each (one situated to be above and one below the liquid level). Each bottle was filled with 500 ml of tap water. Into just the Example 15 test bottle was suspended above the liquid level a 10.7 cm², 45 mil thick LDPE plaque that contained 8 wt % sodium borohydride. Both the Example 15 and Example 16 bottles were then purged with nitrogen until the oxygen content was essentially zero and were then sealed. For comparison, the Example 17 test bottle was purged with 100% hydrogen until the oxygen content was essentially zero and was then sealed. The internal oxygen content of the liquid over time was then tracked using the Oxysense™ test methodology, with calibration against standards being performed immediately before each measurement. The results of that testing are shown in FIG. 12. As can be seen from this Figure, in the control bottle oxygen ingress began immediately and continued at a steady rate. In contrast, with the bottle containing a hydrogen generator inside the container there was no measurable increase in oxygen concentration inside the bottle over a period of more than a month. For both of these bottles, there was no visible change in the amount of headspace over the course of this experiment, and the bottles retained their normal appearance. In contrast, the bottle purged with hydrogen visibly collapsed over time. By day 27 the headspace had completely disappeared and substantial oxygen ingress was observed thereafter.

The invention claimed is:

1. A container comprising:
    a shell; and
    a closure;
    wherein the shell and the closure are complementary;
    wherein the closure includes an active substance which releases molecular hydrogen by reaction with moisture;
    wherein the active substance is dispersed in a matrix for restricting the rate at which moisture can reach the active substance, thereby reducing and controlling the rate of generation of molecular hydrogen; and
    wherein the container includes a catalyst for catalyzing a reaction between the molecular hydrogen and molecular oxygen;
    wherein the active substance dispersed in the matrix is capable of generating molecular hydrogen for a period of time of at least one week.

2. A container according to claim 1, wherein the shell further comprises a polymer resin component.

3. A container according to claim 1 wherein the catalyst is selected from the group consisting of Group VIII metals, Group VIII metal salts, transition metals, transition metal carbides, transition metal nitrides, transition metal borides, and combinations thereof.

4. A container according to claim 1, wherein the matrix is a polymeric matrix.

5. A container according to claim 1 wherein the active substance is selected from the group consisting of Group I, II, and III metals, Group I, II, and III metal hydrides, rare earth metals, rare earth hydrides, alkali metal borohydrides, alkaline earth metal borohydrides, alkali metal aluminum hydrides, silicon hydrides, tin hydrides, and combinations thereof.

6. A container according to claim 1 wherein the active substance is selected from the group consisting of sodium hydride, lithium hydride, sodium borohydride, sodium metal, lithium metal, potassium metal, calcium hydride, magnesium hydride, lithium aluminum hydride, and combinations thereof.

7. A container according to claim 4 wherein the polymeric matrix comprises a polyolefin.

8. A container according to claim 1 wherein the container surrounds a food or beverage.

9. A container according to claim 1 wherein said shell comprises a polyester.

10. A container according to claim 1, wherein the ratio of the weight of active substance to matrix material is at least 0.01.

11. A container according to claim 10, wherein the matrix includes from 1 to 16 wt % of active substance relative to the weight of a polymer in the matrix.

12. A container according to claim 1, wherein the closure comprises a selectively removable film sealed to the shell.

13. A container according to claim 1, wherein said container includes 5 ppm or less of catalyst relative to the weight of said container, excluding any contents thereof.

14. A container according to claim 1, said container including a permeable wall comprising one or more polymers that have in the absence of any oxygen scavenging a permeability between about $6.5 \times 10^{-7}$ cm³-cm/(m²-atm-day) and about $1 \times 10^4$ cm³-cm/(m²-atm-day).

15. A container according to claim 1, wherein the matrix comprises a polymeric matrix material selected from the group consisting of low density polyethylene, high density polyethylene, polypropylene, and ethylene vinyl acetate.

16. A container according to claim 1, wherein complementary portions of the shell and closure are screw-threaded.

17. A container according to claim 1 wherein the active substance is capable of generating molecular hydrogen for a period of time of at least one month.

18. A container according to claim 1 wherein the active substance is capable of generating molecular hydrogen for a period of time of at least three months.

19. A container according to claim 1 wherein the active substance is capable of generating molecular hydrogen for a period of time of at least six months.

20. A container comprising:
- a shell; and
- a closure;
- wherein the shell and the closure are complementary;
- wherein the closure includes an active substance which releases molecular hydrogen by reaction with moisture;
- wherein the active substance is dispersed in a matrix for restricting the rate at which moisture can reach the active substance, thereby reducing and controlling the rate of generation of molecular hydrogen;
- wherein the container includes a catalyst for catalyzing a reaction between the molecular hydrogen and molecular oxygen;
- wherein the active substance dispersed in the matrix is capable of generating molecular hydrogen for a period of time of at least one month;
- wherein the active substance is selected from the group consisting of sodium hydride, lithium hydride, sodium borohydride, sodium metal, lithium metal, potassium metal, calcium hydride, magnesium hydride, lithium aluminum hydride, and combinations thereof;
- wherein the matrix comprises a polymeric matrix material selected from the group consisting of low density polyethylene, high density polyethylene, polypropylene, and ethylene vinyl acetate.

\* \* \* \* \*